(12) United States Patent
Wang et al.

(10) Patent No.: US 11,587,593 B2
(45) Date of Patent: Feb. 21, 2023

(54) METHOD AND APPARATUS FOR DISPLAYING MUSIC POINTS, AND ELECTRONIC DEVICE AND MEDIUM

(71) Applicant: BEIJING BYTEDANCE NETWORK TECHNOLOGY CO., LTD., Beijing (CN)

(72) Inventors: Yan Wang, Beijing (CN); Shu Liu, Beijing (CN)

(73) Assignee: BEIJING BYTEDANCE NETWORK TECHNOLOGY CO., LTD., Beijing (CN)

(*) Notice: Subject to any disclaimer, the term of this patent is extended or adjusted under 35 U.S.C. 154(b) by 0 days.

(21) Appl. No.: 17/735,962

(22) Filed: May 3, 2022

(65) Prior Publication Data

US 2022/0293136 A1 Sep. 15, 2022

Related U.S. Application Data

(63) Continuation of application No. PCT/CN2020/126261, filed on Nov. 3, 2020.

(30) Foreign Application Priority Data

Nov. 4, 2019 (CN) .......................... 201911067475.1

(51) Int. Cl.
*G10H 1/00* (2006.01)
*G11B 27/34* (2006.01)
(Continued)

(52) U.S. Cl.
CPC ........... *G11B 27/34* (2013.01); *G10H 1/0008* (2013.01); *G11B 27/031* (2013.01);
(Continued)

(58) Field of Classification Search
CPC .... G10H 2220/106; G10H 1/00; G10H 1/368; G10H 2240/325; G10H 2220/101;
(Continued)

(56) References Cited

U.S. PATENT DOCUMENTS 7,569,761 B1 8/2009 Iampietro et al.
2003/0160944 A1 8/2003 Foote et al.
(Continued)

FOREIGN PATENT DOCUMENTS

CN 101587706 A 11/2009
CN 104103300 A 10/2014
(Continued)

OTHER PUBLICATIONS

International Patent Application No. PCT/CN2020/126261; Int'l Search Report; dated Jan. 26, 2021; 2 pages.
(Continued)

*Primary Examiner* — Marlon T Fletcher
(74) *Attorney, Agent, or Firm* — BakerHostetler

(57) ABSTRACT

Disclosed are a method and apparatus for displaying music points, and an electronic device and a medium. One specific embodiment of the method includes: acquiring audio material; analyzing initial music points in the audio material, wherein the initial music points include beat points and/or note starting points in the audio material; and on an operation interface of video clipping, displaying, according to the position of the audio material on a clip timeline and the positions of target music points in the audio material, identifiers of the target music points on the clip timeline, wherein the target music points are some of or all of the initial music points. According to the embodiment, the time for a user to process audio material and to make music points is reduced, and the flexibility of tools is also guaranteed.

20 Claims, 9 Drawing Sheets

(51) Int. Cl.
  *G11B 27/031* (2006.01)
  *G06F 3/04842* (2022.01)
(52) U.S. Cl.
  CPC ... *G06F 3/04842* (2013.01); *G10H 2210/051* (2013.01); *G10H 2210/076* (2013.01); *G10H 2220/101* (2013.01)
(58) Field of Classification Search
  CPC ....... G10H 2220/126; G10H 2210/091; G10H 2210/076; G10H 2210/061; G10H 2210/031; G10H 2210/041
  See application file for complete search history.

(56) References Cited

U.S. PATENT DOCUMENTS

| | | | | |
|---|---|---|---|---|
| 2006/0165240 | A1* | 7/2006 | Bloom | G10H 1/368 |
| | | | | 381/61 |
| 2007/0044639 | A1* | 3/2007 | Farbood | G10H 1/0025 |
| | | | | 84/609 |
| 2015/0128788 | A1* | 5/2015 | Brewer | G10H 7/00 |
| | | | | 84/609 |
| 2020/0013380 | A1* | 1/2020 | Kakoyiannis | G06F 16/685 |
| 2020/0342646 | A1* | 10/2020 | Wang | H04N 5/265 |
| 2022/0208155 | A1* | 6/2022 | Ivers | G06F 16/686 |

FOREIGN PATENT DOCUMENTS

| | | | | | |
|---|---|---|---|---|---|
| CN | 107393569 | A | | 11/2017 | |
| CN | 107483843 | A | | 12/2017 | |
| CN | 109429078 | A | | 3/2019 | |
| CN | 109545177 | A | | 3/2019 | |
| CN | 110233976 | A | * | 9/2019 | ........... G10H 1/0025 |
| CN | 110265057 | A | | 9/2019 | |
| CN | 110336960 | A | | 10/2019 | |
| CN | 110769309 | A | | 2/2020 | |
| EP | 1587111 | A1 | | 10/2005 | |
| GB | 2422755 | A | * | 8/2006 | ............. G10H 1/366 |
| JP | 2007-066399 | A | | 3/2007 | |
| KR | 20180027423 | A | * | 6/2016 | |
| WO | WO-2006049141 | A1 | * | 5/2006 | ....... G06F 17/30026 |
| WO | WO-2006079813 | A1 | * | 8/2006 | ............. G10H 1/366 |
| WO | WO 2008/024486 | A2 | | 2/2008 | |

OTHER PUBLICATIONS

"How to do stuck video in Douyin"; http://jingyan.baidu.con/artivle/c45ad29c99658c451753e2ab.html; Baidu; Aug. 2019; accessed Jul. 6, 2022; 9 pages (contains English Translation).

European Patent Application No. 20884477.9; Extended Search Report; dated Oct. 21, 2022; 7 pages.

* cited by examiner

METHOD AND APPARATUS FOR DISPLAYING MUSIC POINTS, AND ELECTRONIC DEVICE AND MEDIUM

This application is a continuation of International Patent Application No. PCT/CN2020/126261, filed on Nov. 3, 2020, which claims the priority to and benefits of Chinese Patent Application No. 201911067475.1, filed on Nov. 4, 2019. All the aforementioned patent applications are hereby incorporated by reference in their entireties.

TECHNICAL FIELD

The present disclosure relates to a field of computer technology, and more particularly, to a method and an apparatus for displaying music points, and an electronic device and a medium.

BACKGROUND

With development of multimedia technology, music processing applications emerge one after another, and users' demands for music processing applications are also increasing day by day. At present, most music processing applications require users to mark music points in music themselves, but most users cannot hear the music points, even if the users can hear the music points, it takes a lot of time.

SUMMARY

An objective of the present disclosure is to provide a method and an apparatus for displaying music points, an electronic device and a medium, to solve the technical problems as mentioned in the above background section.

In a first aspect, the present disclosure discloses a method for displaying music points, the method including: acquiring an audio material; analyzing initial music points in the audio material, and displaying, on an operation interface of video clipping, according to a position of the audio material on a clip timeline and positions of target music points in the audio material, identifiers of the target music points on the clip timeline. The initial music points include beat points and/or note starting points in the audio material, and the target music points are some of or all of the initial music points.

In some embodiments, the method further includes: acquiring a video material for video clipping; determining aligned music points from the above-described target music points; respectively generating, in response to detecting a first user operation on the above-described operation interface, one video clip for each audio clip in the above-described audio material by using the above-described video material, to obtain a plurality of video clips, and displaying, according to the position of the above-described audio material on the clip timeline and the position of the audio clip corresponding to the above-described video clip in the above-described audio material, the above-described video clip on the above-described clip timeline. The video material includes at least one of items below: a picture material and a video material. The aligned music points are used to divide the audio material into a plurality of audio clips. An audio clip and a video clip corresponding to each other have a same duration.

In some embodiments, the determining the aligned music points from the target music points includes: determining, in response to the number of video materials of the video material being less than the number of the plurality of audio clips, according to the number of the above-described video materials, audio clips whose number is equal to the number of the video materials from the plurality of audio clips; and determining the number of the aligned music points according to the number of the audio clips.

In some embodiments, the determining the number of the aligned music points according to the number of the above-described video materials, includes: determining the number of audio clips corresponding to the number of the video materials according to the number of the video materials; determining the first target number of aligned music points according to the number of the audio clips; and selecting, according to the order of priorities of the music points from high to low and/or the order of moments of the music points appearing in the audio material, the first target number of music points from the target music points as the aligned music points. The priority of a primary stress beat point is higher than the priority of a secondary stress beat point, and the priority of the secondary stress beat point is higher than the priority of an accent point.

In some embodiments, the determining the aligned music points from the target music points includes: determining, in response to the number of video materials of the video materials being greater than the number of the plurality of audio clips, the second target number of music points and the target music points as the aligned music points. The second target number is determined according to a difference between the number of the plurality of audio clips and the number of the video materials.

In some embodiments, the respectively generating one video clip for each audio clip in the above-described audio material by using the video material, to obtain a plurality of video clips, includes: determining the audio clip corresponding to the video material according to the duration of the video material, and generating one video clip for the audio clip by using the video material. The length of the video material corresponding to the music clip is not less than the length of the music clip.

In some embodiments, the respectively generating one video clip for each audio clip in the above-described audio material by using the above-described video material, to obtain a plurality of video clips, includes: adjusting, in response to the duration of the video material being less than the duration of the music clip corresponding to the above-described video material, a playback speed of the above-described video material to obtain a video clip whose duration is equal to the duration of the music clip.

In some embodiments, the above-described method further includes: displaying, in response to detecting the second user operation on the first video clip in the operation interface, an adjustment interface for the video material corresponding to the first video clip; determining, in response to a manual clipping operation on the video material on the adjustment interface of the video material, a clipping interval selected by the manual clipping operation in the video material; and clipping, according to the clipping interval, a material from the video material as the second video clip.

In some embodiments, the analyzing initial music points in the audio material, includes: determining, in response to detecting the third user operation on the first control on the operation interface of a music display interface, a primary stress beat point in the audio material as the initial music point; determining, in response to detecting a fourth user operation on a second control on the operation interface of the music display interface, a beat point in the audio material as the initial music point; and determining, in response to detecting the fifth user operation on the third control on the operation interface of the music display interface, an accent point in the audio material as the initial music point. The music display interface is displayed in response to detecting a selection operation on the audio material on the operation interface.

In some embodiments, the above-described method further includes: determining, in response to detecting the third user operation on the operation interface, target music points of the audio from the initial music points. The third user operation includes at least one of items below: an add operation of music points, and a delete operation of music points.

In some embodiments, the displaying, on the operation interface of video clipping, according to the position of the audio material on the clip timeline and the positions of the target music points in the audio material, identifiers of the target music points on the clip timeline, includes: displaying an audio waveform of the audio material on the clip timeline, and displaying an identifier of the target music point in a corresponding position of the audio waveform.

In a second aspect, some embodiments of the present disclosure provide an apparatus for displaying music points, and the apparatus includes: an acquiring unit, an analyzing unit, and a display unit. The acquiring unit is configured to acquire an audio material. The analyzing unit is configured to analyze initial music points in the audio material. The initial music points include beat points and/or note starting points in the audio material. The display unit is configured to display, on an operation interface of video clipping, according to a position of the audio material on a clip timeline and positions of target music points in the audio material, identifiers of the target music points on the clip timeline. The target music points are some of or all of the initial music points.

In some embodiments, the above-described apparatus further includes a first acquiring unit, a determining unit, a generating unit, and a first display unit. The first acquiring unit is configured to acquire a video material for video clipping. The video material includes at least one of items below: a picture material and a video material. The determining unit is configured to determine aligned music points from the above-described target music points. The aligned music points are used to divide the audio material into a plurality of audio clips. The generating unit is configured to respectively generate, in response to detecting a first user operation on the operation interface, one video clip for each audio clip in the audio material by using the video material, to obtain a plurality of video clips. The audio clip and the video clip corresponding to the audio clip have a same duration. The first display unit is configured to display, according to the position of the audio material on the clip timeline and the position of the audio clip corresponding to the video clip in the audio material, the video clip on the clip timeline.

In some embodiments, the determining unit in the apparatus further includes the first determining sub-unit and the second determining unit. The first determining sub-unit is configured to determine, in response to the number of video materials of the video material being less than the number of the plurality of audio clips, according to the number of the video materials, audio clips whose number is equal to the number of the video materials from the plurality of audio clips. The second determining unit is configured to determine the number of the aligned music points according to the number of the audio clips.

In some embodiments, the second determining unit in the determining units in the above-described apparatus is further configured to: determine the number of audio clips corresponding to the number of the above-described video materials according to the number of the video materials; determine the first target number of aligned music points according to the number of the audio clips; and select, according to the order of priorities of the music points from high to low and/or the order of moments of the music points appearing in the above-described audio material, the first target number of music points from the target music points as the aligned music points. The priority of a primary stress beat point is higher than the priority of a secondary stress beat point, and the priority of the secondary stress beat point is higher than the priority of an accent point.

In some embodiments, the determining unit in the above-described apparatus is further configured to: determine, in response to the number of video materials of the video materials being greater than the number of the plurality of audio clips, the first number of music points and the target music points as the aligned music points. The first number is determined according to a difference between the number of the plurality of audio clips and the number of the video materials.

In some embodiments, the generating unit in the apparatus is further configured to: determine the audio clip corresponding to the video material according to the duration of the video material; and generate one video clip for the audio clip by using the video material. The length of the video material corresponding to the music clip is not less than the length of the music clip.

In some embodiments, the generating unit in the apparatus is further configured to: adjust, in response to the duration of the video material being less than the duration of the music clip corresponding to the video material, a playback speed of the video material to obtain a video clip whose duration is equal to the duration of the music clip.

In some embodiments, the apparatus is further configured to: display, in response to detecting the second user operation on the first video clip in the operation interface, an adjustment interface for the video material corresponding to the first video clip; determine, in response to a manual clipping operation on the video material on the adjustment interface of the video material, a clipping interval selected by the manual clipping operation in the video material; and clip, according to the clipping interval, a material from the video material as the second video clip.

In some embodiments, the analyzing unit in the apparatus is further configured to: determine, in response to detecting the third user operation on the first control on the operation interface, a primary stress beat point in the audio material as the initial music point; determine, in response to detecting a fourth user operation on the second control on the operation interface, a beat point in the audio material as the initial music point; and determine, in response to detecting the fifth user operation on the third control on the operation interface, an accent point in the audio material as the initial music point.

In some embodiments, the above-described apparatus is further configured to: determine, in response to detecting the third user operation on the operation interface, target music points of the audio from the initial music points. The third user operation includes at least one of items below: an add operation of music points, and a delete operation of music points.

In some embodiments, the display unit in the apparatus is further configured to: display an audio waveform of the audio material on the clip timeline, and display an identifier of the target music point in a corresponding position of the audio waveform.

In a third aspect, some embodiments of the present disclosure provide an electronic device, which includes: one or more processors, and a storage apparatus having one or more programs stored thereon. When executed by the one or more processors, the one or more programs cause the one or more processors to execute any one of the methods according to the first aspect.

In a fourth aspect, some embodiments of the present disclosure provide a computer-readable medium, having a computer program stored thereon. The program, when executed by a processor, executes any one of the methods according to the first aspect.

In a fifth aspect, some embodiments of the present disclosure provide a computer program, which includes program code. When a computer runs the computer program, the program code executes any one of the methods according to the first aspect.

One embodiment of the above-described respective embodiments of the present disclosure, by analyzing beat and melody of the audio material, determines the music points and displays the same on the clip timeline, which avoids the user marking the music points on the audio material by himself/herself. The user may then perform a video clipping operation according to the marked music points, for example, select a switching point of the video clip according to the displayed music points. Therefore, the user operation is more convenient, and flexibility of the tool is also guaranteed.

DETAILED DESCRIPTION

Figure 1:
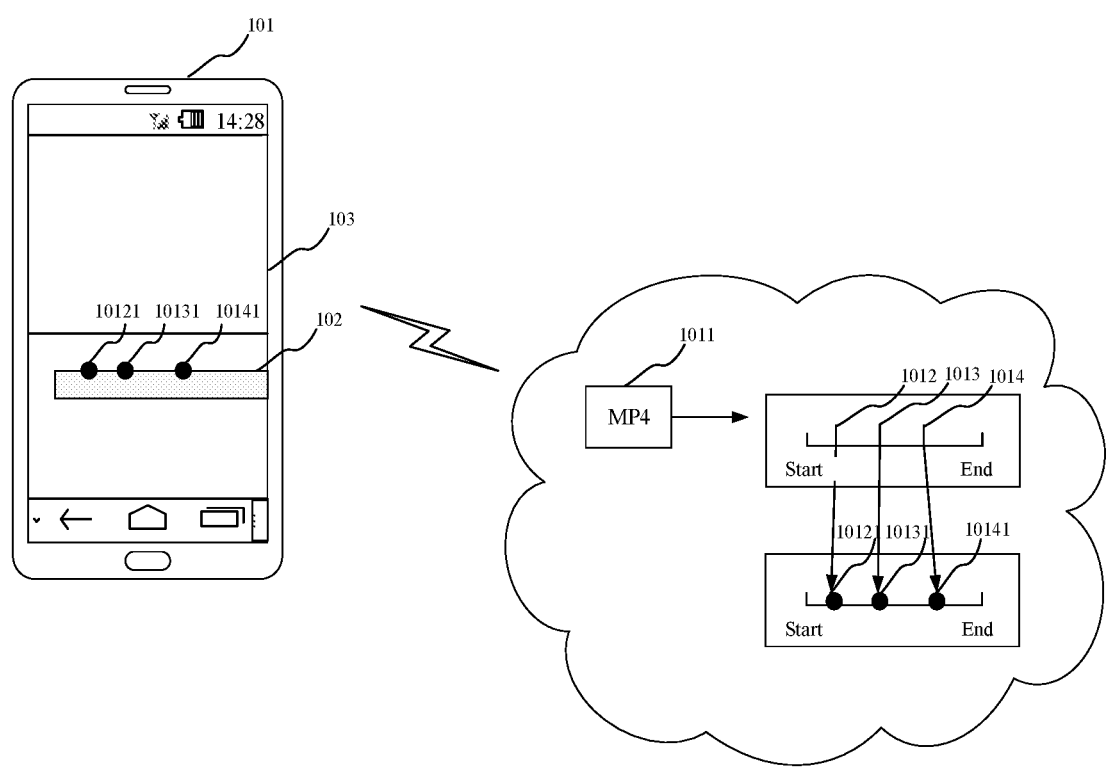
FIG. 1 is a schematic diagram of an application scenario of a method for displaying music points according to some embodiments of the present disclosure.

Embodiments of the present disclosure will be described in more detail below with reference to the accompanying drawings. While certain embodiments of the present disclosure are illustrated in the drawings, it should be understood that, the present disclosure may be implemented in various forms and should not be construed as limited to the embodiments set forth herein. Rather, these embodiments are provided for a thorough and complete understanding of the present disclosure. It should be understood that, the drawings and the embodiments of the present disclosure are only for exemplary purposes, and are not intended to limit the protection scope of the present disclosure.

In addition, it should be noted that, for convenience of description, only the parts related to the relevant invention are illustrated in the drawings. The embodiments of the present disclosure and features of the embodiments may be combined with each other without conflict.

It should be noted that, concepts such as "first" and "second" as mentioned in the present disclosure are only used to distinguish different apparatuses, modules or units, and are not used to limit orders of functions executed by these apparatuses, modules or units or interdependence thereof.

It should be noted that, modifications of "a" and "a plurality" as mentioned in the present disclosure are exemplary rather than limitative; and those skilled in the art should understand that, unless otherwise clearly indicated in the context, they should be understood as "one or more".

The names of messages or information exchanged between a plurality of apparatuses according to the implementation modes of the present disclosure are only for exemplary purposes, and are not intended to limit the protection scope of these messages or information.

The present disclosure will be described in detail below with reference to the accompanying drawings and in conjunction with the embodiments.

FIG. 1 is a schematic diagram of an application scenario of a method for displaying music points according to some embodiments of the present disclosure. As illustrated in the application scenario of FIG. 1, firstly, a terminal device 101 (illustrated as a mobile phone in FIG. 1) obtains an audio material 1011. The audio material 1011 may be an application default audio or an audio selected by a user. The terminal device 101 analyzes the audio material 1011 to obtain initial music points 1012 to 1014 in the audio material 1011. The terminal device 101 generates a corresponding music point identifier 10121 for the music point 1012. The terminal device 101 generates a corresponding music point identifier 10131 for the music point 1013. The terminal device 101 generates a corresponding music point identifier 10141 for the music point 1014. The terminal device 101 displays the music point identifier 10121, the music point identifier 10131 and the music point identifier 10141 on the clip timeline 102 of the audio material 1011 on the operation interface 103 for video clipping.

It may be understood that, the method for displaying music points may be executed by the terminal device 101, or may also be executed by other devices, or may also be executed by various software programs. The terminal device 101 may be, for example, various electronic devices having a display screen, including but not limited to, smart phones, tablet personal computers, e-book readers, laptops, desktops, etc. In addition, an executing body may also be embodied as a server, software, etc. When the executing body is software, it may be installed in the electronic devices as listed above. It may be implemented, for example, as a plurality of pieces of software or software modules for supplying distributed services, or may also be implemented as a single piece of software or a software module, which will not be specifically limited here.

It should be understood that, the number of smart phones in FIG. 1 is only exemplary. There may be any number of smart phones according to implementation needs.

Figure 2A:
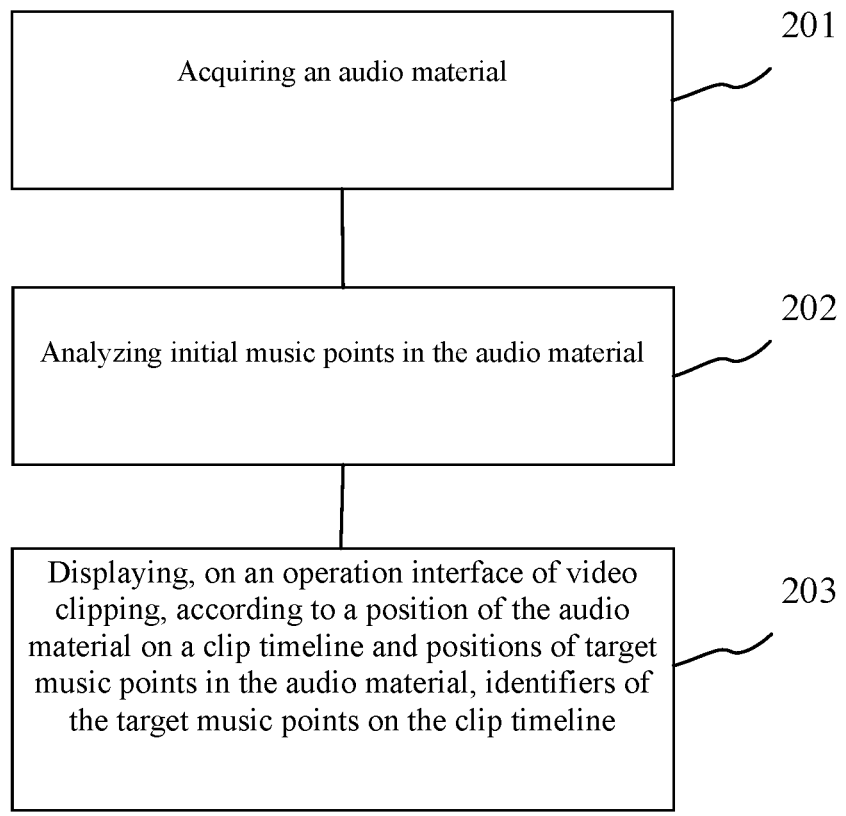
FIG. 2A is a flow chart of some embodiments of a method for displaying music points according to the present disclosure.

In the process of video clipping, the user needs to determine switching points between video clips, and in order to make the music cooperate with the video, usually music points such as beat points and melody points may be used as the switching points of the video clips. This requires the user to listen to music by himself/herself to find music points. However, it is difficult for many users to hear the music points themselves, and even if they can hear the music points, it is very time-consuming and laborious to repeatedly listen to the music to find the music points. In order to improve the speed of video clipping and save the users' time, please refer to FIG. 2A. FIG. 2A illustrates the flow 200 of some embodiments of the method for displaying music points according to the present disclosure. The method for displaying music points includes steps of:

Step 201: acquiring an audio material.

In some embodiments, the executing body of the method for displaying music points (e.g., the terminal device 101 illustrated in FIG. 1) may acquire the audio material through wired connection or wireless connection. The above-described audio material may be music stored locally by the user or music on the network.

Step 202: analyzing initial music points in the audio material.

In some embodiments, the executing body may determine the initial music points of the audio material. Here, the initial music points include beat points and/or note starting points in the audio material.

As an example, when the initial music point is a position in the audio material where the set musicality is changed. The position where the musicality is changed may include the position where the beat is changed and the position where the melody is changed. Based on this, the initial music point may be determined in the mode below: the executing body may analyze the audio material, and determine the beat point and the note starting point therein. The beat point is the position where the beat is changed, and the note starting point is the position where the melody is changed. Specifically, on the one hand, a beat analysis algorithm based on deep learning may be used to analyze the audio material to obtain the beat point in the audio material and a timestamp where the beat point is located; on the other hand, short-term spectrum analysis is performed on the audio material to obtain the note starting point in the audio material and a timestamp where the note starting point is located. Here, the note starting point may be obtained by an onset detector. Then, the beat points and the note starting points obtained in the two modes are unified, and the beat points and note starting points are combined and deduplicated, thereby obtaining the initial music points.

Figure 2B:
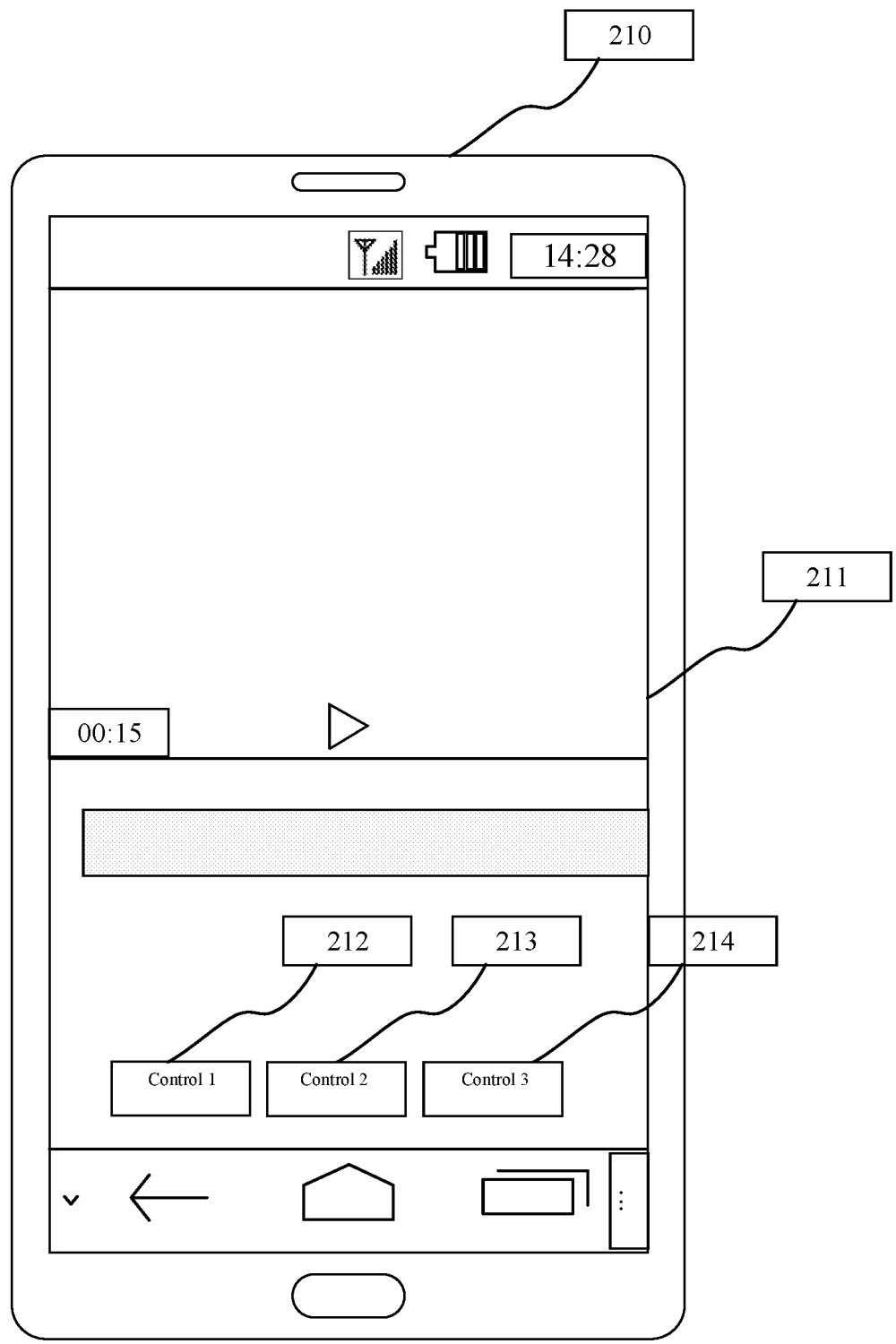
FIG. 2B is a schematic diagram of some application scenarios for displaying a control according to some embodiments of the present disclosure.

As another example, as illustrated in FIG. 2B, in response to detecting the third user operation on the first control 212 on the music display interface 211, a primary stress beat point in audio material is determined as the initial music point. The first control 212 is usually used to trigger determining the primary stress beat in the audio material. The music display interface is displayed in response to detecting a selection operation on the audio material on the operation interface. The primary stress beat usually refers to a strong beat. In music, beats are classified as strong beats and weak beats, and strong beats are usually beats with strong musical strength. As an example, in four fourth beats, the beat strength is expressed as that: the first beat is a strong beat, the second beat is a weak beat, the third beat is a secondary strong beat, and the fourth beat is a weak beat. The four fourth beats take a quarter note as a beat, each measure has time of 4 beats. The third user operation may refer to a user's click operation on the first control 212. In response to detecting the fourth user operation on the second control 213 on the music display interface 211, a beat point in the audio material is determined as the initial music point, and the second control 213 is usually used to trigger determining the beat in the audio material. The fourth user operation may refer to a user's click operation on the second control 213. In response to detecting the fifth user operation on the third control 214 on the music display interface 211, an accent point in the audio material is determined as the initial music point. The third control 214 is usually used to trigger determining an accent in the audio material. The accent may refer to a sound of greater intensity in music. The accent point may be the position where the melody becomes stronger in the note starting points, for example, in a musical score, there is a beat marked with an accent mark, and the accent mark includes at least one of items below: ">" and "^". When ">" and "^" appear at the same time, "^" indicates a stronger accent. The fifth user operation may refer to a user's click operation on the third control 214.

Step 203: displaying, on an operation interface of video clipping, according to a position of the audio material on a clip timeline and positions of target music points in the audio material, identifiers of the target music points on the clip timeline.

In some embodiments, the executing body may display, on the operation interface of video clipping, according to the position of the audio material on the clip timeline and the positions of the target music points in the audio material, the identifiers of the target music points on the clip timeline. The target music points are some of or all of the above-described initial music points.

As an example, the analyzed initial music points may all be displayed as the target music points. For example, assuming that there are three initial music points, namely, a music point a, music point b, and music point c; and the target music points may be the music point a, the music point b, and the music point c as described above.

As another example, in response to detecting the third user operation on the operation interface, the target music points may be selected from the initial music points for display. The third user operation includes at least one of items below: an add operation of music points, and a delete operation of music points. For example, assuming that there are 3 initial music points, namely, the music point a, the music point b and the music point c, when the user adds a music point d, the target music points may be the music point a, the music point b, the music point c, and the music point d as described above. For another example, when the user deletes the music point b, the target music points may be the music point a and the music point c. The above-described identifier may be a preset icon, for example, a triangle, a circle, a star, etc.

Figure 2C:
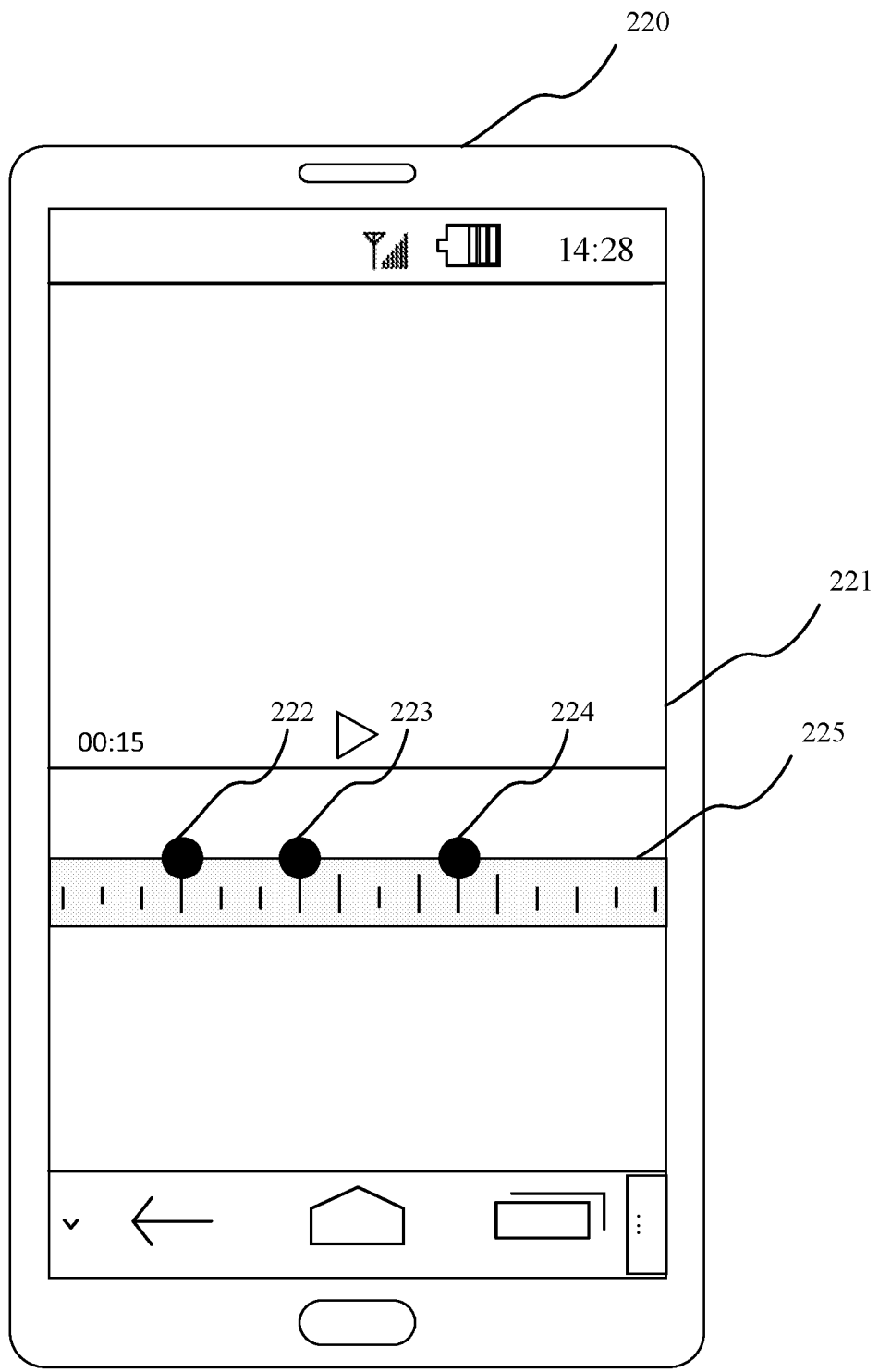
FIG. 2C is a schematic diagram of some application scenarios for displaying music points according to some embodiments of the present disclosure.

In some optional implementations of some embodiments, as illustrated in FIG. 2C, the audio waveform of the audio material may be displayed on the clip timeline 225, and identifiers 222 to 224 of the target music points may be displayed in corresponding positions of the audio waveform. The above-described audio waveform usually refers to an image of an audio displayed in a form of a waveform diagram. The identifiers of the target music points are displayed on the image, according to the positions of the corresponding music points on the above-described image.

As may be seen from the above-described examples, if the user manually determines the music points in the audio material, it may take a lot of time. By analyzing the initial music points in the audio material, efficiency of determining the music points may be improved. The identifiers of the music points are displayed on the clip timeline, which facilitates the user to select the music points.

Figure 3A:
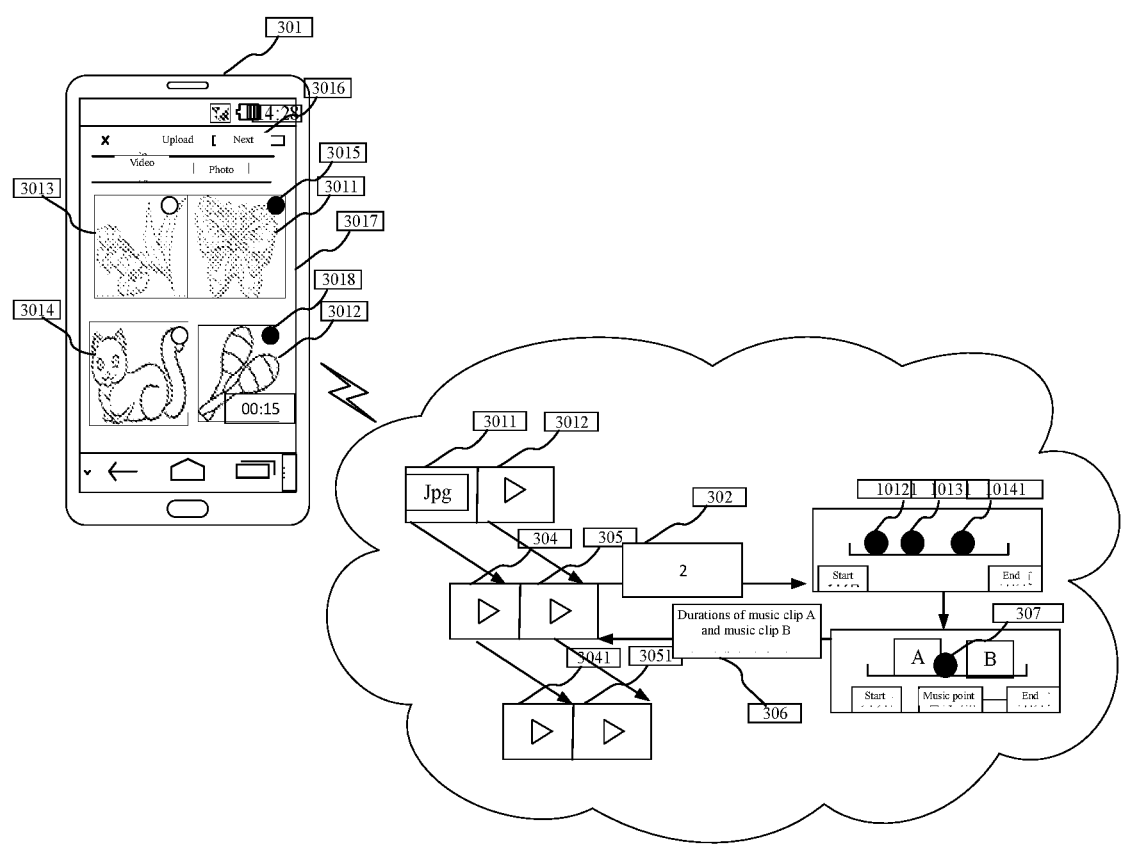
FIG. 3A and FIG. 3B are schematic diagrams of another application scenario of a method for displaying music points according to some embodiments of the present disclosure.
Figure 3B:
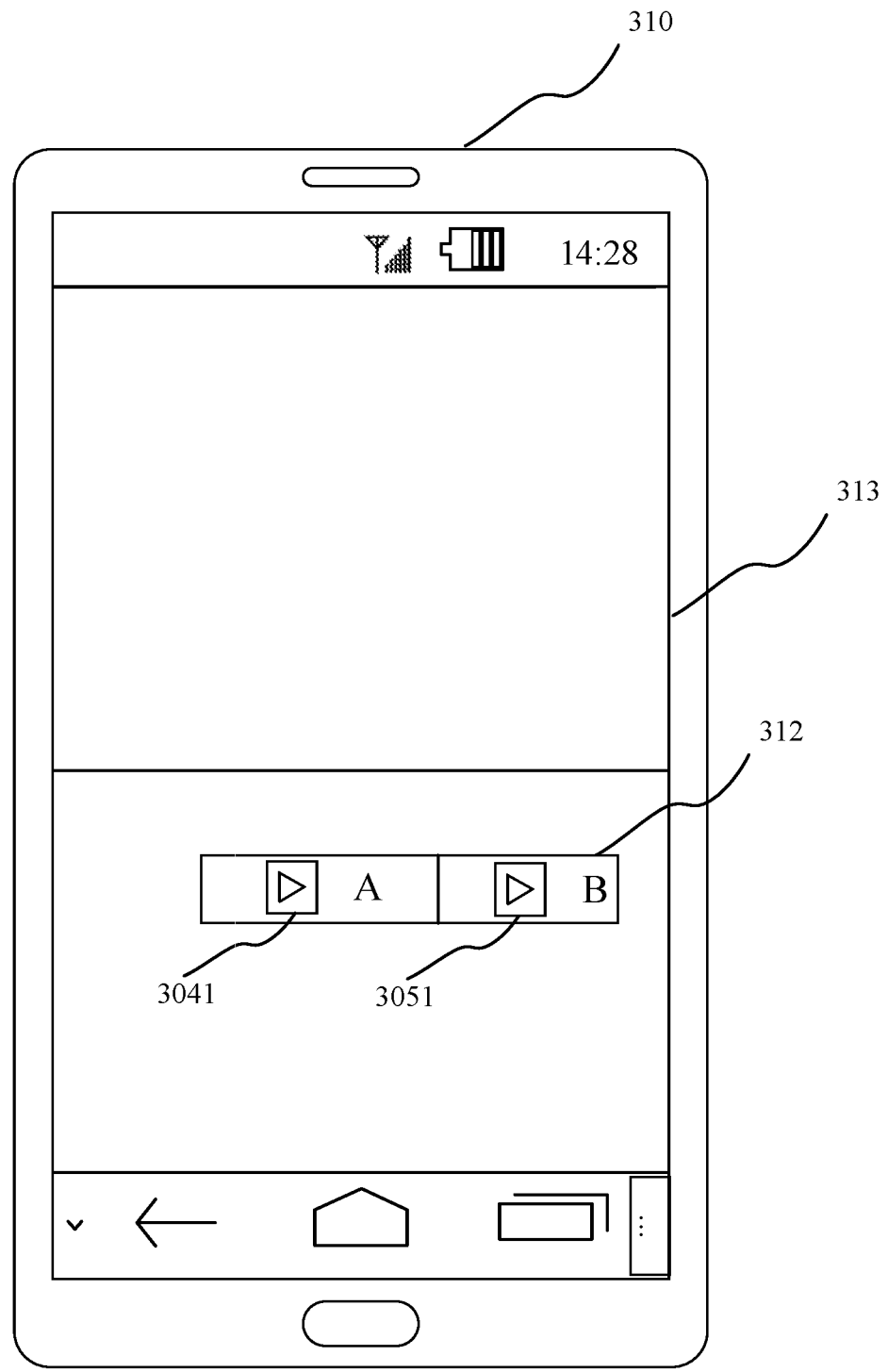

Referring to FIG. 3A and FIG. 3B, they are schematic diagrams of another application scenario of a method for displaying music points according to some embodiments of the present disclosure. As illustrated in the application scenario of FIG. 3A, firstly, the user may select a plurality of video materials on the upload page 3017 of the terminal device 301. For example, the picture 3011, the video 3012, the picture 3013, the picture 3014 illustrated in the upload page 3017. The user clicks positions indicated by the reference sign 3015 and the reference sign 3018, to select the picture 3011 and the video 3012. The user clicks the "Next" button 3016, and the terminal device 301 generates a video material 304 based on the selected picture 3011, and uses the video 3012 as the video material 305. According to the number of the obtained video materials 302 (illustrated as 2 in the figure), the aligned music point 307 is determined from the target music point 10121, the target music point 10131, and the target music point 10141. Meanwhile, the aligned music point 307 may actually divide the audio material into a music clip A and a music clip B. According to the duration of the music clip A and the duration of the music clip B, the video material 304 and the video material 305 are respectively processed to obtain a video clip 3041 and a video clip 3051 respectively corresponding to the music clip A and the music clip B. Then, according to the positions of the music clip A and the music clip B in the audio material, the video clip 3041 and the video clip 3051 may be displayed on the clip timeline 312 of the operation interface 313 for the video clipping.

It may be understood that, the method for displaying music points may be executed by the terminal device 301, or may also be executed by other devices, or may also be executed by various software programs. The terminal device 301 may be, for example, various electronic devices having a display screen, including but not limited to, smart phones, tablet personal computers, e-book readers, laptops, desktops, etc. In addition, an executing body may also be embodied as a server, software, etc. When the executing body is software, it may be installed in the electronic devices as listed above. It may be implemented, for example, as a plurality of pieces of software or software modules for supplying distributed services, or may also be implemented as a single piece of software or a software module, which will not be specifically limited here.

It should be understood that, the number of smart phones in FIG. 3A to FIG. 3B is only exemplary. There may be any number of smart phones according to implementation needs.

Figure 4A:
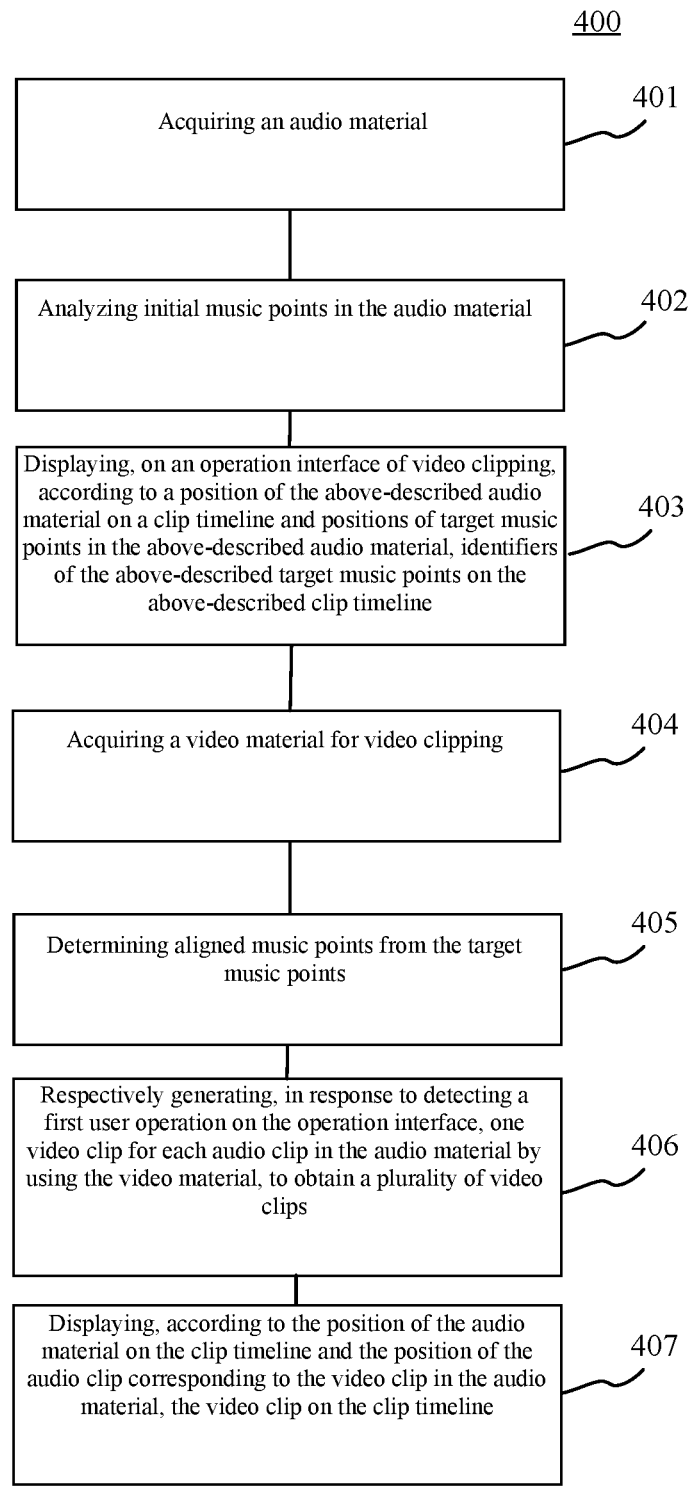
FIG. 4A is a flow chart of some other embodiments of a method for displaying music points according to the present disclosure.

With continued reference to FIG. 4A, the flow 400 of some embodiments of the method for displaying music points according to the present disclosure is illustrated. The method for displaying music points includes steps of:

Step 401: acquiring an audio material.

Step 402: analyzing initial music points in the audio material.

Step 403: displaying, on an operation interface of video clipping, according to a position of the audio material on a clip timeline and positions of target music points in the audio material, identifiers of the target music points on the clip timeline.

In some embodiments, steps 201 to 203 in those embodiments corresponding to FIG. 2 may be referred to for specific implementation of steps 401 to 403 and technical effects brought about, and no details will be repeated here.

Step 404: acquiring a video material for video clipping.

In some embodiments, the above-described executing body may firstly acquire the video material for video clipping, and then acquire the audio material. Meanwhile, the above-described executing body may also acquire the audio material firstly, and then acquire the video material for video clipping.

In some embodiments, the above-described executing body may acquire the video material for video clipping through wired connection or wireless connection. The above-described video material includes at least one of items below: a picture material and a video material. As an example, the above-described picture material may be a picture stored locally by the user, or may also be a picture downloaded by the user from the Internet. The above-described video material may be a video uploaded by the user, a video stored locally by the user, or a video downloaded by the user from the Internet.

Step 405: determining the aligned music points from the target music points.

In some embodiments, the executing body may firstly obtain the target music points in the audio material determined in step 203. Then, the above-described executing body may select the target number of aligned music points from the respective obtained target music points. The above-described aligned music points may be all of the target music points, or may also be some of the target music points. The target number may be determined according to the number of the video materials obtained, or may also be determined according to the number of strong beats in the audio material, or may also be the number set by the user. The above-described executing body, based on the determined aligned music points, divides the audio material to obtain a plurality of audio clips. As an example, when 4 aligned music points are determined, the above-described audio materials may be divided into 5 music clips.

As an example, in the case where the number of video materials of the video material is less than the number of the plurality of audio clips, audio clips whose number is the same as the number of the video materials may be determined from the plurality of audio clips according to the number of the video materials; and then the number of aligned music points is determined according to the number of the audio clips. As an example, in the case where 5 video materials are acquired, it may be determined that 5 audio clips are required, so that it may be determined that 4 aligned music points are required. Here, firstly, the above-described executing body may determine, according to the number of the video materials, the number of audio clips corresponding to the number of the video materials. For example, in the case where the number of video materials is 5, the corresponding number of audio clips is also 5. Then, according to the number of the audio clips, the first target number of aligned music points is determined. For example, in the case where the number of audio clips is 5, then the first target number of aligned music points should be 4. Finally, according to the order of priorities of the music points from high to low and/or the order of moments of the music points appearing in the audio material, the first target number of music points are selected from the target music points as aligned music points. The priorities of the music points may be preset. For example, the priority of a primary stress beat point may be higher than the priority of a secondary stress beat point, and the priority of the secondary stress beat point may be higher than the priority of an accent point.

As another example, in the case where the number of video materials of the video material is more than the number of the plurality of audio clips, the second target number of music points and the target music points may be determined as aligned music points, and the executing body may firstly calculate a difference between the number of the plurality of audio clips and the number of the video materials, and then determine the value of the second target number according to the difference. For example, in the case where 5 video materials are obtained but there are only 3 audio clips, the 5 video materials require 4 aligned music points; according to the only 3 audio clips, it may be determined that there are only 2 aligned music points now, in this case, it may be determined that the value of the second target number is 2. That is, 2 more aligned music points need to be determined. The two aligned music points here may be manually added by the user, or may also be music beats other than the existing two aligned music points that have been selected by the executing body from the audio materials, for example, intermediate beats inserted between the existing beat points.

As another example, in the case where the number of video materials of the video material is more than the number of the plurality of audio clips, video materials whose number is equal to the number of the plurality of audio clips may be selected, and video materials whose number is equal to the number of the plurality of audio clips are determined from the video material. For example, the selection may be performed according to the order in which the video materials are acquired. Then, according to the number of the plurality of audio clips, the number of the aligned music points is determined. As an example, in the case where 5 video materials and 4 audio clips are acquired, 4 video materials may be selected, and it may be determined that 3 aligned music points are required according to the 4 audio clips.

Step 406: respectively generating, in response to detecting the first user operation on the operation interface, one video clip for each audio clip in the audio material by using the video material, to obtain a plurality of video clips.

In some embodiments, when detecting the first user operation on the operation interface, the executing body generates one video clip respectively for each audio clip in the audio material, by using the video material, to obtain a plurality of video clips. The first user operation is usually used to trigger aligning the plurality of audio clips and the plurality of video clips.

As an example, the audio clips may be aligned according to the selection order of the video materials. For example, in the case where there are three video materials, namely, a video material 1, a video material 2, and a video material 3, then the video material 1 may be aligned with the audio clip that appears firstly in the audio material. The audio clips may also be aligned according to durations of the video materials. For example, the longest video material is aligned with the longest audio clip.

For each audio clip in the audio material, the executing body may generate one video clip with a same duration as the audio clip for the audio clip, based on the video material. As an example, assuming that the audio material is divided into 3 audio clips, and durations of the three audio clips are respectively 1 second, 2 seconds, and 3 seconds, then durations of the video clips corresponding to the music clips may also be respectively 1 second, 2 seconds, and 3 seconds.

As an example, the above-described executing body may generate a plurality of video clips according to one video material. For example, assuming that the executing body acquires a 10-second video material and an 8-second audio material, the executing body divides the audio material into 3 audio clips according to the aligned music points, with durations of respectively 2 seconds, 3 seconds, and 3 seconds, then the executing body may clip 3 different video clips from the video material, with durations of respectively 2 seconds, 3 seconds, and 3 seconds.

As another example, the above-described executing body may also determine an audio clip corresponding to the video material according to the duration of the video material. The length of the video material corresponding to the music clip is not less than the length of the music clip. One video clip is generated for the audio clip by using the video material. For example, in the case where one video material is used to generate one video clip for one audio clip, and when the duration of the video material is greater than the duration of the audio clip, the video clip having the duration equal to the duration of the audio clip may be cropped from the original video material, or the playback speed of the original video material may be sped up to shorten the duration, and then the video material having a changed speed is taken as the video clip, so that the duration of the video clip is equal to the duration of the audio clip.

As another example, when the duration of the video material is less than the duration of the audio clip, the playback speed of the original video material may be slowed down to lengthen the duration, and then the video material having a changed speed is taken as the video clip, so that the length of the video clip is equal to the length of the audio clip. It may be understood that, for picture materials in the video material, one video material with a fixed duration, for example, 3 seconds, may be generated from the picture materials, and then the video material may be used to generate the video clip for the music clip.

Figure 4B:
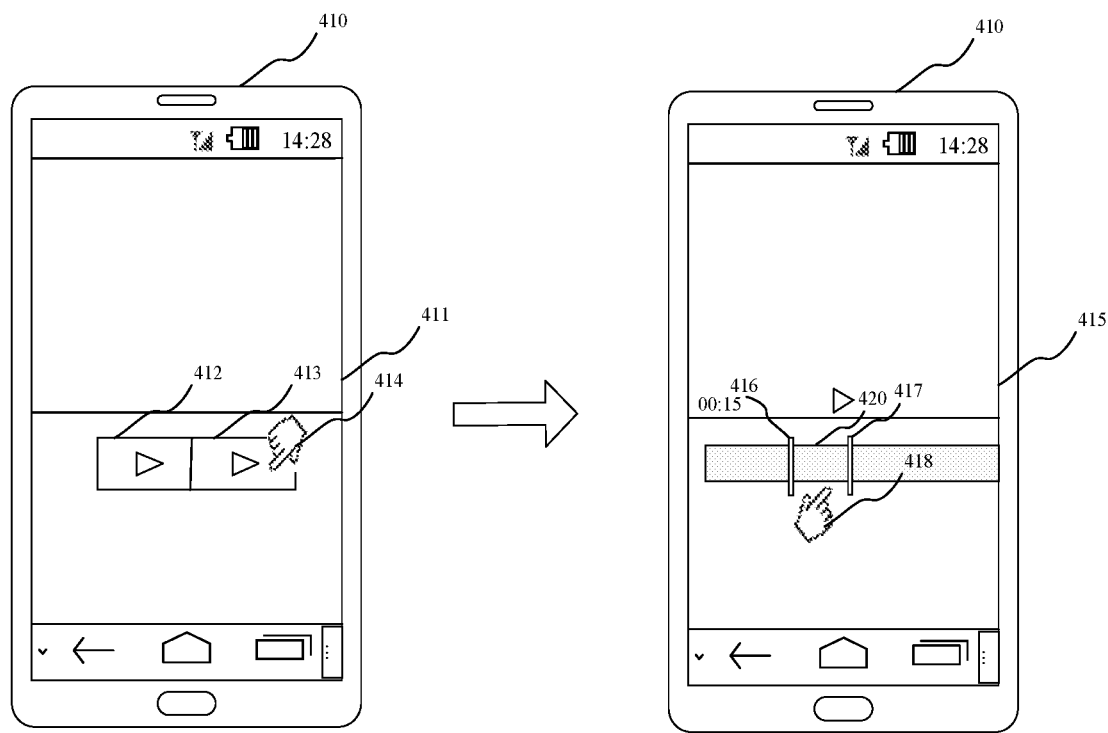
FIG. 4B and FIG. 4C are schematic diagrams of some application scenarios for adjusting a video clip according to some embodiments of the present disclosure.

As another example, as illustrated in FIG. 4B, in response to detecting the second user operation 414 on the first video clip 413 in the operation interface 411, an adjustment interface 415 of the video material 419 corresponding to the first video clip 413 is displayed. The first video clip 413 is usually the video clip in which a user operation is detected. The second user operation 414 may be a user's click operation on the first video clip 413 to enter the adjustment interface 415 of the video material 419 corresponding to the first video clip 413. In response to detecting a manual clipping operation 418 on the video material 419 on the adjustment interface 415 of the video material 419, a clipping interval between the reference sign 416 and the reference sign 417 selected by the manual clipping operation 418 in the video material 419 is determined, and the clipping interval is determined according to the duration of the audio clip corresponding to the first video clip 413. The manual clipping operation 418 may be the user sliding the video material 419 corresponding to the first video clip 413 in order to make the video clip 420 in the clipping interval become what the user needs. The above-described executing body may align the video clip 420 to the position of the first video clip 413. According to the clipping interval, a material is clipped from the video material as the second video clip 420. The video clip within the clipping interval is taken as the second video clip 420.

Step 407: displaying, according to the position of the audio material on the clip timeline and the position of the audio clip corresponding to the video clip in the audio material, the video clip on the clip timeline.

In some embodiments, the above-described executing body may display, according to the position of the audio material on the clip timeline and the position of the audio clip corresponding to the video clip in the audio material, the video clip on the clip timeline. As an example, the audio material may be divided into 3 clips sequentially according to the music points, for example, the clip A may be from second 0 to second 2, the clip B may be from second 2 to second 5, and the clip C may be from second 5 to second 10. The corresponding video clips are respectively a clip a, a clip b, and a clip c. Then, the video clips a, b, and c are displayed sequentially on the operation interface of the video clip.

Figure 4C:
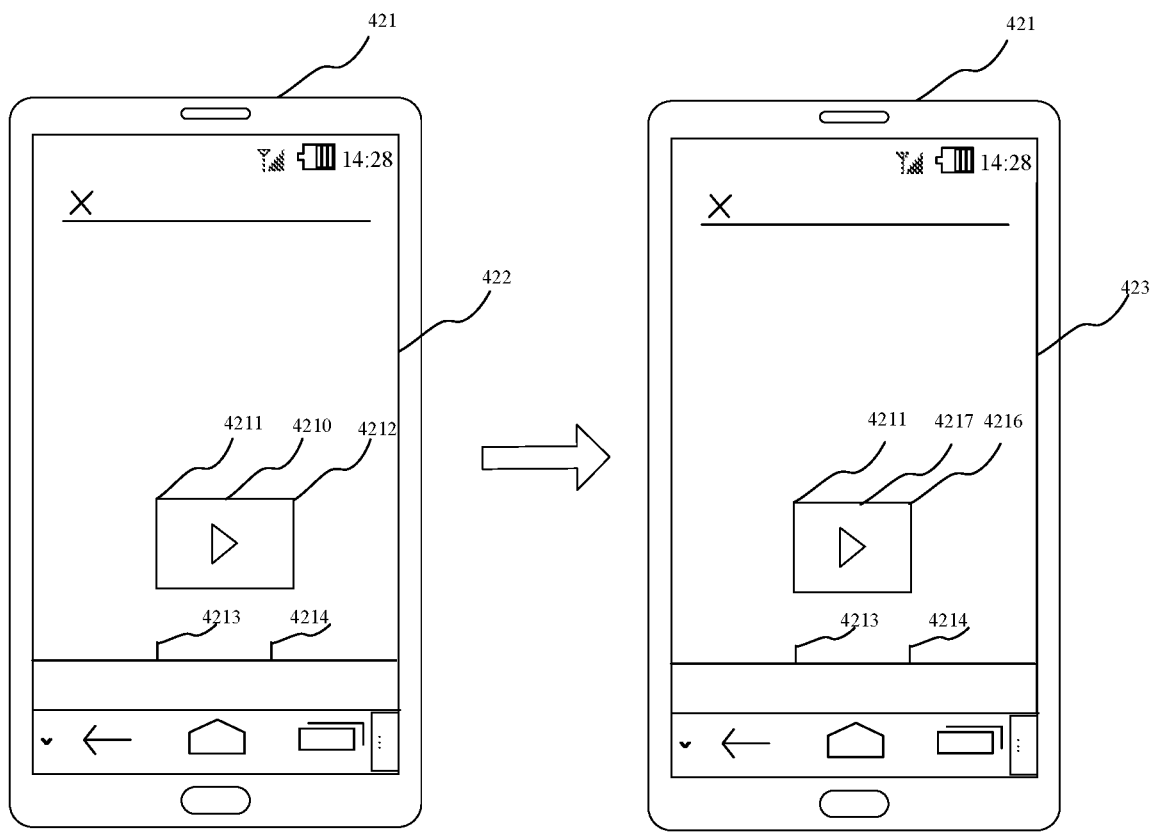

As an example, when the user drags the video boundary of the video clip on the clip timeline, and when the distance between the position to which the video boundary is dragged and a certain music point is less than a preset threshold, the video boundary of the video clip may be determined as the position of the music point. For example, as illustrated in FIG. 4C, when the user drags the video boundary 4212 of the video clip 4210 to the position illustrated in the interface 422, the video boundary 4212 of the video clip 4210 may be automatically snapped to the position of the music point 4214; the video clip 4210 may obtain the corresponding video clip 4217; and meanwhile, the video clip 4217 may also have the corresponding video boundary 4216.

In the method for displaying music points disclosed in some embodiments of the present disclosure, a plurality of video clips and a plurality of music clips are obtained according to the acquired video material and the determined target music points, and the plurality of video clips are displayed on the operation interface, which allows the user to intuitively see the playback sequence and durations of the video clips, thereby improving the speed for the user to clip the video.

Figure 5:
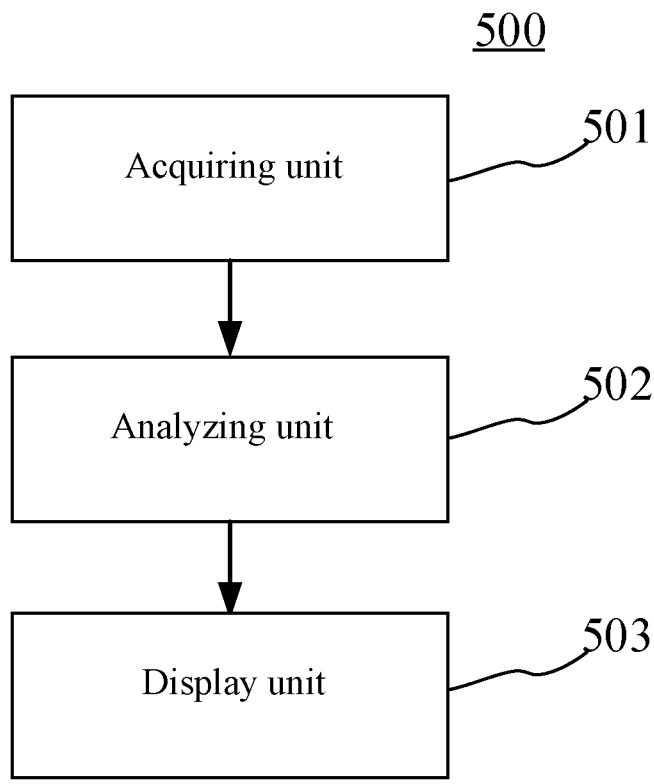
FIG. 5 is a structural schematic diagram of some embodiments of an apparatus for displaying music points according to the present disclosure.

Further referring to FIG. 5, as implementations for the respective methods in the above-described respective diagrams, the present disclosure provides some embodiments of the apparatus for displaying music points; these apparatus embodiments correspond to those method embodiments as described above in FIG. 2; and the apparatus may be specifically applied to various electronic devices.

As illustrated in FIG. 5, the apparatus 500 for displaying music points according to some embodiments includes: an acquiring unit 501, an analyzing unit 502 and a display unit 503. The acquiring unit 501 is configured to acquire an audio material; the analyzing unit 502 is configured to analyze initial music points in the audio material, and the initial music points include beat points and/or note starting points in the audio material; the display unit 503 is configured to display, on an operation interface of video clipping, according to a position of the audio material on a clip timeline and positions of target music points in the audio material, identifiers of the target music points on the clip timeline; the target music points are some of or all of the initial music points.

In some embodiments, the apparatus 500 for displaying music points further includes a first acquiring unit, a determining unit, a generating unit, and a first display unit. The first acquiring unit is configured to acquire a video material for video clipping, the video material includes at least one of items below: a picture material and a video material. The determining unit is configured to determine aligned music points from the target music points, the aligned music points are used to divide the audio material into a plurality of audio clips. The generating unit is configured to respectively generate, in response to detecting a first user operation on the operation interface, one video clip for each audio clip in the audio material by using the video material, to obtain a plurality of video clips, the audio clip and the video clip corresponding to the audio clip have a same duration. The first display unit is configured to display, according to the position of the audio material on the clip timeline and the position of the audio clip corresponding to the clip in the audio material, the video clip on the clip timeline.

In some embodiments, the determining unit in the apparatus 500 for displaying music points further includes: the first determining sub-unit and the second determining unit. The first determining sub-unit is configured to determine, in response to the number of video materials of the video material being less than the number of the plurality of audio clips, according to the number of the video materials, audio clips whose number is equal to the number of the video materials from the plurality of audio clips. The second determining unit is configured to determine the number of the aligned music points according to the number of the audio clips.

In some embodiments, the second determining unit in the determining units in the apparatus 500 for displaying music points is further configured to: determine the number of audio clips corresponding to the number of the video materials according to the number of the video materials; determine a first target number of aligned music points according to the number of the audio clips; and select, according to the order of priorities of the music points from high to low and/or the order of moments of the music points appearing in the audio material, the first target number of music points from the target music points as the aligned music points. The priority of a primary stress beat point is higher than the priority of a secondary stress beat point, and the priority of the secondary stress beat point is higher than the priority of an accent point.

In some embodiments, the determining unit in the apparatus 500 for displaying music points is further configured to: determine, in response to the number of video materials of the video materials being greater than the number of the plurality of audio clips, the first number of music points and the target music points as the aligned music points. The first number is determined according to the difference between the number of the plurality of audio clips and the number of the video materials.

In some embodiments, the generating unit in the apparatus 500 for displaying music points is further configured to: determine the audio clip corresponding to the video material according to the duration of the video material; and generate one video clip for the above-described audio clip by using the video material. The length of the video material corresponding to the music clip is not less than the length of the music clip.

In some embodiments, the generating unit in the apparatus 500 for displaying music points is further configured to: adjust, in response to the duration of the video material being less than the duration of the music clip corresponding to the video material, the playback speed of the video material to obtain a video clip whose duration is equal to the duration of the music clip.

In some embodiments, the apparatus 500 for displaying music points is further configured to: display, in response to detecting a second user operation on the first video clip in the operation interface, an adjustment interface for the video material corresponding to the first video clip; determine, in response to a manual clipping operation on the video material on the adjustment interface of the video material, a clipping interval selected by the manual clipping operation in the video material; and clip, according to the clipping interval, a material from the video material as the second video clip.

In some embodiments, the analyzing unit 502 in the apparatus 500 for displaying music points is further configured to: determine, in response to detecting the third user operation on a first control on the operation interface, a primary stress beat point in the audio material as the initial music point; determine, in response to detecting the fourth user operation on the second control on the operation interface, a beat point in the audio material as the initial music point; and determine, in response to detecting the fifth user operation on the third control on the operation interface, an accent point in the audio material as the initial music point.

In some embodiments, the apparatus 500 for displaying music points is further configured to: determine, in response to detecting the third user operation on the operation interface, a target music point of the audio from the initial music points. The above-described third user operation includes at least one of items below: an add operation of music points, and a delete operation of music points.

In some embodiments, the display unit 503 in the apparatus 500 for displaying music points is further configured to: display an audio waveform of the audio material on the clip timeline, and display an identifier of the target music point in a corresponding position of the audio waveform.

As may be seen from the above-described example, if the user manually determines the music points in the audio material, it may take a lot of time. By analyzing the initial music points in the audio material, efficiency of determining the music points may be improved. The identifiers of the music point are displayed on the clip timeline, which facilitates the user to select the music points.

Figure 6:
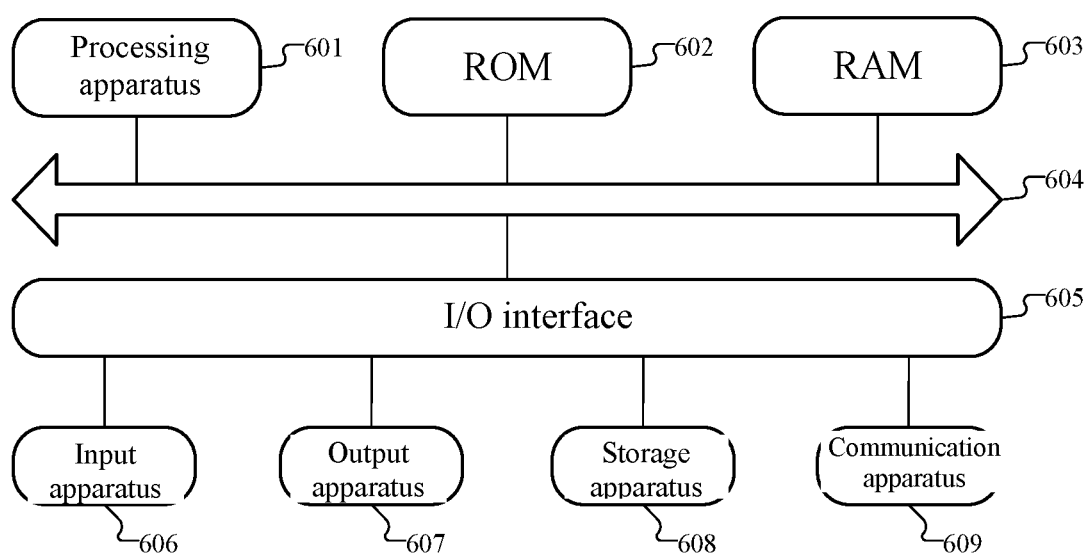
FIG. 6 is a structural schematic diagram of an electronic device suitable for implementing some embodiments of the present disclosure.

Referring next to FIG. 6, FIG. 6 illustrates a structural schematic diagram of an electronic device (e.g., the server in FIG. 1) 600 suitable for implementing some embodiments of the present disclosure. The terminal device according to some embodiments of the present disclosure may include, but not limited to, a mobile terminal such as a mobile phone, a laptop, a digital broadcast receiver, a Personal Digital Assistant (PDA), a Portable Android Device (PAD), a Portable Multimedia Player (PMP), a vehicle-mounted terminal (e.g., a vehicle-mounted navigation terminal), etc., and a stationary terminal such as a digital TV, a desktop computer, etc. The terminal device illustrated in FIG. 6 is only an example, and should not impose any limitation on the function and use scope of the embodiments of the present disclosure.

As illustrated in FIG. 6, the electronic device 600 may include a processing apparatus (e.g., a central processing unit, a graphics processor, etc.) 601, which may executes various appropriate actions and processing according to a program stored in a Read-Only Memory (ROM) 602 or a program loaded from a storage apparatus 608 into a Random Access Memory (RAM) 603. The RAM 603 further stores various programs and data required for operation of the electronic device 600. The processing apparatus 601, the ROM 602, and the RAM 603 are connected with each other through a bus 604. An input/output (I/O) interface 605 is also coupled to the bus 604.

Usually, apparatuses below may be coupled to the I/O interface 605: input apparatuses 606 including, for example, a touch screen, a touch pad, a keyboard, a mouse, a camera, a microphone, an accelerometer, a gyroscope, etc.; output apparatuses 607 including, for example, a Liquid Crystal Display (LCD), a speaker, a vibrator, etc.; a storage apparatus 608 including, for example, a magnetic tape, a hard disk, etc.; and a communication apparatus 609. The communication apparatus 609 may allow the electronic device 600 to perform wireless or wired communication with other device so as to exchange data. Although FIG. 6 shows the electronic device 600 having various apparatuses, it should be understood that, it is not required to implement or have all the apparatuses illustrated, and the electronic device 600 may alternatively implement or have more or fewer apparatuses. Each block illustrated in FIG. 6 may represent one apparatus, or may also represent a plurality of apparatuses as required.

Particularly, according to some embodiments of the present disclosure, the flows as described above with reference to the flow charts may be implemented as computer software programs. For example, some embodiments of the present disclosure include a computer program product, comprising a computer program carried on a computer-readable medium, the computer program containing program codes for executing the method illustrated in the flow chart. In such embodiments, the computer program may be downloaded and installed from the network via the communication apparatus 609, or installed from the storage apparatus 608, or installed from the ROM 602. When executed by the processing apparatus 601, the computer program executes the above-described functions limited in the methods according to some embodiments of the present disclosure.

It should be noted that, in some embodiments of the present disclosure, the above-described computer-readable medium may be a computer-readable signal medium or a computer-readable storage medium, or any combination of the above two. The computer-readable storage medium may be, for example, but not limited to, an electronic, magnetic, optical, electromagnetic, infrared, or semiconductor system, apparatus, or device, or any suitable combination of the above. More specific examples of the computer-readable storage medium may include, but not limited to: an electrical connection having one or more conductors, a portable computer diskette, a hard disk, a Random Access Memory (RAM), a Read-Only Memory (ROM); an Erasable Programmable Read-Only Memory (EPROM or Flash memory); an optical fiber, a Portable Compact Disc Read-Only Memory (CD-ROM); an optical storage apparatus; a magnetic storage apparatus; or any suitable combination of the above. In some embodiments of the present disclosure, a computer-readable storage medium may be any tangible medium that contains or stores a program that may be used by or in conjunction with an instruction executing system, an apparatus, or a device. Rather, in some embodiments of the present disclosure, the computer-readable signal medium may include a data signal propagated in baseband or as a portion of a carrier wave, which carries a computer-readable program code therein. Such propagated data signals may take a variety of forms, including but not limited to, electromagnetic signals, optical signals, or any suitable combination of the above. The computer-readable signal medium may also be any computer-readable medium other than a computer-readable storage medium; and the computer-readable signal medium may transmit, propagate, or transport programs for use by or in combination with the instruction executing system, the apparatus, or the device. The program code embodied on the computer-readable medium may be transmitted by using any suitable medium, including, but not limited to, an electrical wire, an optical cable, a Radio Frequency (RF), etc., or any suitable combination of the above.

In some implementation modes, the client and the server may communicate with any network protocol currently known or to be researched and developed in the future such as HyperText Transfer Protocol (HTTP), and may communicate (via a communication network) and interconnect with digital data in any form or medium. Examples of communication networks include a Local Area Network ("LAN"), a Wide Area Network ("WAN"), the Internet, and an end-to-end network (e.g., an ad hoc end-to-end network), as well as any network currently known or to be researched and developed in the future.

The above-described computer-readable medium may be included in the above-described electronic device; or may also exist alone without being assembled into the electronic device. The above-described computer-readable medium carries one or more programs, and when the above-described one or more programs are executed by the electronic device, the electronic device acquires an audio material; analyzes initial music points in the above-described audio material, and displays, on an operation interface of video clipping, according to a position of the above-described audio material on a clip timeline and positions of target music points in the above-described audio material, identifiers of the above-described target music points on the above-described clip timeline. The above-described initial music points include beat points and/or note starting points in the above-described audio material, and the target music points are some of or all of the above-described initial music points.

The computer program codes for executing the operations according to some embodiments of the present disclosure may be written in one or more programming languages or a combination thereof; the above-described programming languages include object-oriented programming languages such as Java, Smalltalk, C++, and also include conventional procedural programming languages such as "C" language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a Local Area Network (LAN) or a Wide Area Network (WAN), or the connection may be made to an external computer (for example, through the Internet using an Internet Service Provider).

The flow chart and block diagrams in the accompanying drawings illustrate the architecture, functionality, and operation of possible implementations of systems, methods, and computer program products according to various embodiments of the present invention. In this regard, each block in the flow chart or block diagrams may represent a module, segment, or portion of instructions, which comprises one or more executable instructions for implementing the specified logical function(s). It should also be noted that, in some alternative implementations, the functions noted in the block may occur out of the order noted in the accompanying drawings. For example, two blocks illustrated in succession may, in fact, be executed substantially concurrently, or the blocks may sometimes be executed in the reverse order, depending upon the functionality involved. It should also be noted that, each block of the block diagrams and/or flow charts, and combinations of blocks in the block diagrams and/or flow charts, may be implemented by special purpose hardware-based systems that execute the specified functions, or may also be implemented by a combination of special purpose hardware and computer instructions.

The units as described in some embodiments of the present disclosure may be implemented by means of software, or may also be implemented by means of hardware. The described unit may also be provided in a processor, which, for example, may be described as: a processor, including an acquiring unit, an analyzing unit and a display unit. The names of these units do not constitute a limitation on the units per se in some cases, for example, the acquiring unit may also be described as "a unit for acquiring an audio material".

The functions described herein above may be executed, at least partially, by one or more hardware logic components. For example, without limitation, available exemplary types of hardware logic components include: a Field Programmable Gate Array (FPGA), an Application Specific Integrated Circuit (ASIC), an Application Specific Standard Product (ASSP), a System on Chip (SOC), a Complex Programmable Logical Device (CPLD), etc.

According to one or more embodiments of the present disclosure, there is provided a method for displaying music points. The method includes: acquiring an audio material; analyzing initial music points in the audio material; and displaying, on an operation interface of video clipping, according to a position of the audio material on a clip timeline and positions of target music points in the audio material, identifiers of the target music points on the clip timeline. The initial music points include beat points and/or note starting points in the audio material, and the target music points are some of or all of the initial music points.

According to one or more embodiments of the present disclosure, the method further includes: acquiring a video material for video clipping; determining aligned music points from the target music points; respectively generating, in response to detecting a first user operation on the operation interface, one video clip for each audio clip in the audio material by using the video material, to obtain a plurality of video clips; displaying, according to the position of the audio material on the clip timeline and the position of the audio clip corresponding to the video clip in the audio material, the video clip on the clip timeline. The video material includes at least one of items below: a picture material and a video material. The aligned music points are used to divide the audio material into a plurality of audio clips. The audio clip and the video clip corresponding to the audio clip have a same duration.

According to one or more embodiments of the present disclosure, the determining the aligned music points from the target music points includes: determining, in response to the number of video materials of the video material being less than the number of the plurality of audio clips, according to the number of the video materials, audio clips whose number is equal to the number of the video materials from the above-described plurality of audio clips; and determining the number of the aligned music points according to the number of the audio clips.

According to one or more embodiments of the present disclosure, the determining the number of the aligned music points according to the number of the video materials, includes: selecting, according to the order of priorities of the music points from high to low, the target number of music points from the target music points as the aligned music points. The priority of a primary stress beat point is higher than the priority of a secondary stress beat point, and the priority of the secondary stress beat point is higher than the priority of an accent point.

According to one or more embodiments of the present disclosure, the determining the aligned music points from the target music points includes: determining, in response to the number of video materials of the video materials being greater than the number of the plurality of audio clips, the first number of music points and the target music points as the aligned music points. The first number is determined according to the difference between the number of the plurality of audio clips and the number of the video materials.

According to one or more embodiments of the present disclosure, the respectively generating one video clip for each audio clip in the audio material by using the video material, to obtain a plurality of video clips, includes: determining the audio clip corresponding to the video material according to the duration of the video material; and generating one video clip for the audio clip by using the video material. The length of the video material corresponding to the music clip is not less than the length of the music clip According to one or more embodiments of the present disclosure, the respectively generating one video clip for each audio clip in the above-described audio material by using the above-described video material, to obtain a plurality of video clips, includes: adjusting, in response to the duration of the video material being less than the duration of the music clip corresponding to the video material, the playback speed of the video material to obtain the video clip whose duration is equal to the duration of the music clip.

According to one or more embodiments of the present disclosure, the method further includes: displaying, in response to detecting the second user operation on the first video clip in the operation interface, an adjustment interface for the video material corresponding to the first video clip; determining, in response to a manual clipping operation on the video material on the adjustment interface of the video material, a clipping interval selected by the manual clipping operation in the video material; and clipping, according to the clipping interval, a material from the video material as the second video clip.

According to one or more embodiments of the present disclosure, the analyzing initial music points in the audio material, includes: determining, in response to detecting the third user operation on the first control on the operation interface, a primary stress beat point in the audio material as the initial music point; determining, in response to detecting the fourth user operation on the second control on the operation interface, a beat point in the audio material as the initial music point; and determining, in response to detecting the fifth user operation on the third control on the operation interface, an accent point in the audio material as the initial music point.

According to one or more embodiments of the present disclosure, the method further includes: determining, in response to detecting the third user operation on the operation interface, target music points of the audio from the above-described initial music points. The third user operation includes at least one of items below: an add operation of music points, and a delete operation of music points.

According to one or more embodiments of the present disclosure, the displaying, on an operation interface of video clipping, according to the position of the above-described audio material on the clip timeline and the positions of the target music points in the above-described audio material, identifiers of the above-described target music points on the clip timeline, includes: displaying an audio waveform of the audio material on the clip timeline, and displaying an identifier of the target music point in a corresponding position of the audio waveform.

According to one or more embodiments of the present disclosure, the apparatus includes an acquiring unit, an analyzing unit, and a display unit. The acquiring unit is configured to acquire an audio material. The analyzing unit is configured to analyze initial music points in the audio material, and the initial music points include beat points and/or note starting points in the audio material. The display unit is configured to display, on an operation interface of video clipping, according to a position of the audio material on a clip timeline and positions of target music points in the audio material, identifiers of the target music points on the clip timeline, and the target music points are some of or all of the above-described initial music points.

According to one or more embodiments of the present disclosure, there is provided an electronic device, which includes one or more processors and a storage apparatus having one or more programs stored thereon. When executed by the one or more processors, the one or more programs cause the one or more processors to execute the method according to any one of the above-described embodiments.

According to one or more embodiments of the present disclosure, there is provided a computer-readable medium, having a computer program stored thereon. The program, when executed by a processor, executes the method according to any one of the above-described embodiments.

According to one or more embodiments of the present disclosure, there is provided a computer program, comprising program code. When a computer runs the computer program, the program code executes the method according to any one of the above-described embodiments.

The above description is merely description of some preferred embodiments of the present disclosure and technical principles applied thereto. Those skilled in the art should understand that, the scope of invention involved in the embodiments of the present disclosure is not limited to the technical solution formed by the specific combination of the above-described technical features, and should also cover, without departing from the above-described inventive concept, other technical solutions formed by any combination of the above-described technical features or equivalent features thereof. For example, a technical solution is formed by mutually replacing the above-described features with the technical features disclosed (but not limited to) in the embodiments of the present disclosure with similar functions.

The invention claimed is:
1. A method for displaying music points, comprising:
acquiring an audio material;
analyzing initial music points in the audio material, wherein the initial music points comprise beat points or note starting points in the audio material;
displaying, on an operation interface of video clipping, according to a position of the audio material on a clip timeline and positions of target music points in the audio material, identifiers of the target music points on the clip timeline, wherein the target music points are some of or all of the initial music points;
determining aligned music points from the target music points, wherein the audio material is divided into a plurality of audio clips based on the aligned music points, and wherein the determining aligned music points from the target music points further comprises:
determining, in response to determining that a number of video materials is greater than a number of the plurality of audio clips, a second target number of music points and the target music points as the aligned music points, wherein the second target number is determined based on a difference between the number of the plurality of audio clips and the number of the video materials.

2. The method according to claim 1, wherein the method further comprises:
- acquiring a video material for the video clipping, wherein the video material comprises at least one of a picture material or a video material;
- respectively generating, in response to detecting a user operation on the operation interface, one video clip for each audio clip in the audio material by using the video material, to obtain a plurality of video clips, wherein an audio clip and a video clip corresponding to the audio clip have a same duration; and
- displaying, according to the position of the audio material on the clip timeline and the position of the audio clip corresponding to the video clip in the audio material, the video clip on the clip timeline.

3. The method according to claim 2, wherein the determining the aligned music points from the target music points further comprises:
- determining a first target number of the aligned music points according to the number of video materials of the video material;
- selecting, according to an order of priorities of the music points from high to low and/or an order of moments of the music points appearing in the audio material, the first target number of music points from the target music points as the aligned music points, wherein a priority of a primary stress beat point is higher than a priority of a secondary stress beat point, and the priority of the secondary stress beat point is higher than a priority of an accent point.

4. The method according to claim 3, wherein the determining a first target number of the aligned music points according to a number of video materials of the video material, comprises:
- determining, in response to the number of video materials of the video material being less than the number of the plurality of audio clips, according to the number of the video materials, audio clips whose number is equal to the number of the video materials from the plurality of audio clips; and
- determining the first target number of the aligned music points according to the number of the audio clips.

5. The method according to claim 2, wherein the respectively generating one video clip for each audio clip in the audio material by using the video material, to obtain a plurality of video clips, comprises:
- determining the audio clip corresponding to the video material according to a duration of the video material, wherein a length of the video material corresponding to the music clip is not less than a length of the music clip; and
- generating one video clip for the audio clip by using the video material.

6. The method according to claim 2, wherein the respectively generating one video clip for each audio clip in the audio material by using the video material, to obtain a plurality of video clips, comprises:
- adjusting, in response to a duration of the video material being less than a duration of the music clip corresponding to the video material, a playback speed of the video material to obtain a video clip whose duration is equal to the duration of the music clip.

7. The method according to claim 2, wherein the method further comprises:
- displaying, in response to detecting another user operation on the first video clip in the operation interface, an adjustment interface for the video material corresponding to the first video clip;
- determining, in response to a manual clipping operation on the video material on the adjustment interface of the video material, a clipping interval selected by the manual clipping operation in the video material; and
- clipping, according to the clipping interval, a material from the video material as a second video clip.

8. The method according to claim 1, wherein the analyzing initial music points in the audio material, comprises:
- determining, in response to detecting a first user operation on a first control on a music display interface, a primary stress beat point in the audio material as the initial music point, wherein the music display interface is displayed in response to detecting a selection operation on the audio material on the operation interface;
- determining, in response to detecting a second user operation on a second control on the music display interface, a beat point in the audio material as the initial music point; and
- determining, in response to detecting a third user operation on a third control on the music display interface, an accent point in the audio material as the initial music point.

9. The method according to claim 1, wherein the method further comprises:
- determining, in response to detecting a user operation on the operation interface, target music points of the audio from the initial music points, wherein the user operation comprises at least one of an add operation of music points or a delete operation of music points.

10. The method according to claim 1, wherein the displaying, on an operation interface of video clipping, according to a position of the audio material on a clip timeline and positions of target music points in the audio material, identifiers of the target music points on the clip timeline, comprises:
- displaying an audio waveform of the audio material on the clip timeline, and displaying an identifier of the target music point in a corresponding position of the audio waveform.

11. The method according to claim 2, wherein the analyzing initial music points in the audio material, comprises:
- determining, in response to detecting a first user operation on a first control on a music display interface, a primary stress beat point in the audio material as the initial music point, wherein the music display interface is displayed in response to detecting a selection operation on the audio material on the operation interface;
- determining, in response to detecting a second user operation on a second control on the music display interface, a beat point in the audio material as the initial music point; and
- determining, in response to detecting a third user operation on a third control on the music display interface, an accent point in the audio material as the initial music point.

12. The method according to claim 2, wherein the method further comprises:
- determining, in response to detecting another user operation on the operation interface, target music points of the audio from the initial music points, wherein the another user operation comprises at least one of an add operation of music points or, and a delete operation of music points.

13. The method according to claim 2, wherein the displaying, on an operation interface of video clipping, according to a position of the audio material on a clip timeline and positions of target music points in the audio material, identifiers of the target music points on the clip timeline, comprises:

displaying an audio waveform of the audio material on the clip timeline, and displaying an identifier of the target music point in a corresponding position of the audio waveform.

14. The method according to claim 3, wherein the analyzing initial music points in the audio material, comprises:
determining, in response to detecting a first user operation on a first control on a music display interface, a primary stress beat point in the audio material as the initial music point, wherein the music display interface is displayed in response to detecting a selection operation on the audio material on the operation interface;
determining, in response to detecting a second user operation on a second control on the music display interface, a beat point in the audio material as the initial music point; and
determining, in response to detecting a first user operation on a third control on the music display interface, an accent point in the audio material as the initial music point.

15. The method according to claim 3, wherein the method further comprises:
determining, in response to detecting another user operation on the operation interface, target music points of the audio from the initial music points, wherein the another user operation comprises at least one of an add operation of music points or a delete operation of music points.

16. An electronic device, comprising:
one or more processors; and
one or more memories, having one or more programs stored thereon;
wherein when executed by the one or more processors, the one or more programs cause the one or more processors to perform operations rising:
acquiring an audio material;
analyzing initial music points in the audio material, wherein the initial music points comprise at least one of beat points or note starting points in the audio material;
displaying, on an operation interface of video clipping, according to a position of the audio material on a clip timeline and positions of target music points in the audio material, identifiers of the target music points on the clip timeline, wherein the target music points are some of or all of the initial music points;
determining aligned music points from the target music points, wherein the audio material is divided into a plurality of audio clips based on the aligned music points, and wherein the determining aligned music points from the target music points further comprises:
determining, in response to determining that a number of video materials is greater than a number of the plurality of audio clips, a second target number of music points and the target music points as the aligned music points, wherein the second target number is determined based on a difference between the number of the plurality of audio clips and the number of the video materials.

17. The electronic device of claim 16, the operations further comprising:
acquiring a video material for the video clipping, wherein the video material comprises at least one of a picture material or a video material;
respectively generating, in response to detecting a user operation on the operation interface, one video clip for each audio clip in the audio material by using the video material, to obtain a plurality of video clips, wherein an audio clip and a video clip corresponding to the audio clip have a same duration; and
displaying, according to the position of the audio material on the clip timeline and the position of the audio clip corresponding to the video clip in the audio material, the video clip on the clip timeline.

18. The electronic device of claim 17, the operations further comprising:
adjusting, in response to a duration of the video material being less than a duration of the music clip corresponding to the video material, a playback speed of the video material to obtain a video clip whose duration is equal to the duration of the music clip.

19. The electronic device of claim 17, the operations further comprising:
displaying, in response to detecting another user operation on the first video clip in the operation interface, an adjustment interface for the video material corresponding to the first video clip;
determining, in response to a manual clipping operation on the video material on the adjustment interface of the video material, a clipping interval selected by the manual clipping operation in the video material; and
clipping, according to the clipping interval, a material from the video material as a second video clip.

20. A non-transitory computer-readable medium, having a computer program stored thereon, wherein the program, when executed by a processor, cause the processor to perform operations comprising:
acquiring an audio material;
analyzing initial music points in the audio material, wherein the initial music points comprise at least one of beat points or note starting points in the audio material;
displaying, on an operation interface of video clipping, according to a position of the audio material on a clip timeline and positions of target music points in the audio material, identifiers of the target music points on the clip timeline, wherein the target music points are some of or all of the initial music points;
determining aligned music points from the target music points, wherein the audio material is divided into a plurality of audio clips based on the aligned music points, and wherein the determining aligned music points from the target music points further comprises:
determining, in response to determining that a number of video materials is greater than a number of the plurality of audio clips, a second target number of music points and the target music points as the aligned music points, wherein the second target number is determined based on a difference between the number of the plurality of audio clips and the number of the video materials.

* * * * *